(12) United States Patent
Ahn

(10) Patent No.: US 8,045,985 B2
(45) Date of Patent: Oct. 25, 2011

(54) APPARATUS AND METHOD FOR PROVIDING VOICE SERVICE WITHOUT DISCONTINUANCE IN MOBILE COMMUNICATION SYSTEM

(75) Inventor: Ho-Jung Ahn, Seoul (KR)

(73) Assignee: Samsung Electronics Co., Ltd (KR)

( * ) Notice: Subject to any disclaimer, the term of this patent is extended or adjusted under 35 U.S.C. 154(b) by 1042 days.

(21) Appl. No.: 11/873,873

(22) Filed: Oct. 17, 2007

(65) Prior Publication Data

US 2008/0102840 A1     May 1, 2008

(30) Foreign Application Priority Data

Oct. 25, 2006  (KR) ............................. 2006-0103846

(51) Int. Cl.
*H04W 4/00*         (2009.01)

(52) U.S. Cl. ............... 455/435.2; 455/432.1; 455/432.3; 455/436; 455/427; 370/331; 370/352; 370/353; 370/360; 379/258; 379/272

(58) Field of Classification Search .................. 455/423, 455/432.1–445, 552.1; 370/352–357, 331, 370/360; 379/258, 272
See application file for complete search history.

(56) References Cited

U.S. PATENT DOCUMENTS

| 7,711,366 | B1* | 5/2010 | O'Neil et al. ................. 455/438 |
| 2002/0110116 | A1* | 8/2002 | Aaltonen ...................... 370/352 |
| 2005/0025134 | A1* | 2/2005 | Armistead ..................... 370/352 |
| 2005/0037753 | A1* | 2/2005 | Andersen et al. ........... 455/435.2 |
| 2006/0209798 | A1* | 9/2006 | Oikarinen et al. ............ 370/352 |
| 2006/0251058 | A1* | 11/2006 | Xu et al. ....................... 370/352 |
| 2007/0183394 | A1* | 8/2007 | Khandelwal et al. ......... 370/352 |

FOREIGN PATENT DOCUMENTS

| KR | 1020050062333 | 6/2005 |
| KR | 1020060018675 | 3/2006 |

* cited by examiner

*Primary Examiner* — Kamran Afshar
*Assistant Examiner* — Kathy Wang-Hurst
(74) *Attorney, Agent, or Firm* — The Farrell Law Firm, P.C.

(57) ABSTRACT

Provided is an apparatus and method for providing a voice service without discontinuance in a mobile communication system. The apparatus includes a controller for receiving a system information block of a first network system or a system information block of a second network system from an interface module, and transmitting a network selection change request to the interface module to change a network system mode; and a network selector for, when the system information block of the first network system does not comprise voice switched domain information for location area update, driving a timer according to a selection of a user, changing the network system mode into the second network system, and executing location area update to thereby provide the voice service.

8 Claims, 7 Drawing Sheets

```
************************************************
*****       BEFORE 2ND LEVEL SIB DECODING    *****
************************************************

HEX DUMP OF SIGNALLING_MSG:
9EAA102C 31FB014D 8269084C 109DCE20 0200D1FW B7000000 B00000000 000000
RRC DECODE : RECEIVED SIM TYPE 6 (LAST SEGMENT SHORT/COMPLETE SIB(s) SHORT)
         LAST SEGMENT INFO : SIB TYPE=1 (SIB 1), SEG IND=1, BLEN=45.
         COMPLETE SIB LIST....
            1) SIB: TYPE=2 (SIB 2), BLEN=20
            2) SIB: TYPE=7 (SIB 7), BLEN=17
            3) SIB: TYPE=26 (SIB 18), BLEN=63

VALUE SYSINFOTYPE1 : : =
{
CN-COMMONGSM-MAP-NAS-SYSINFO '0BBF'H.
CN-DOMAINSYSINFOLIST
{
     {
     CN-DOMAINIDENTITY PS-DOMAIN,
     CN-TYPE GSM-MAP : '0101'H.
     CN-DRX-CYCLELENGTHCOEFF 7
     }
}
```

FIG. 2
(PRIOR ART)

```
***************************************
*****        BEFORE 2ND LEVEL SIB DECODING     *****
***************************************

HEX DUMP OF SIGNALLING_MSG:
484E0197 C4800509 B00B1010 043BF7B6 C9FD14F9 24DAD000 00000000 00000
RRC DECODE : RECEIVED SIM TYPE 8 (COMPLETE SIB(s) SHORT)...
     COMPLETE SIB LIST...
        1) SIB: TYPE=1 (SIB 1), BLEN=152

VALUE SYSINFOTYPE1 : : =
{
CN-COMMONGSM-MAP-NAS-SYSINFO '2001'H.
CN-DOMAINSYSINFOLIST
{
    {
    CN-DOMAINIDENTITY CS-DOMAIN,
    CN-TYPE GSM-MAP : '3601'H.
    CN-DRX-CYCLELENGTHCOEFF 7
    }, {
    CN-DOMAINIDENTITY PS-DOMAIN,
    CN-TYPE GSM-MAP : '01400'H.
    CN-DRX-CYCLELENGTHCOEFF 7
    }
}
```

FIG. 3
(PRIOR ART)

APPARATUS AND METHOD FOR PROVIDING VOICE SERVICE WITHOUT DISCONTINUANCE IN MOBILE COMMUNICATION SYSTEM

PRIORITY

This application claims priority under 35 U.S.C. §119 to an application filed in the Korean Intellectual Property Office on Oct. 25, 2006 and assigned Serial No. 2006-103846, the contents of which are incorporated herein by reference.

BACKGROUND OF THE INVENTION

1. Field of the Invention

The present invention relates generally to a voice service without discontinuance. In particular, the present invention relates to an apparatus and method for providing a voice service by temporarily camping a User Equipment (UE) of a Third-Generation (3G) network system in a Second-Generation (2G) network system, when the 3G network system temporarily malfunctions and a circuit service, which is the basic voice call transmission/reception function, is unavailable in an area where a user can receive a 3G mobile communication service.

2. Description of the Related Art

At present, the 2G mobile communication service is predominant in the global mobile communication market, and the 3G service is gradually expanding its ground. Accordingly, service providers are expanding a Universal Mobile Telecommunications System (UMTS) Network (UTRAN) and now they are in a transitional period of upgrading the network system from R99/R4 version system, which is a non-High Speed Downlink Packet Access (HSDPA) system, into an R5 system capable of supporting an HSDPA system to competitively provide a more advanced 3.5-Generation (3.5G) HSDPA service. Accordingly, network systems including core commercial networks are being upgraded with respect to software and hardware in various areas. The network systems need to be upgraded continuously to support communication technology that continues to advance.

As a result, the number of errors is gradually increasing in networks interlocking with user equipments. Erroneous operation frequently occurs, when a network vender changes software configurations or when hardware is upgraded. Similar malfunction intermittently occurs even during normal operation due to internal conditions of the network vender.

The malfunction of the networks occurs more frequency in the 3G networks that are commercially set up at present and under progress than in the second-generation networks that are already stabilized. It is desirable with respect to a network and user equipments that a user equipment in support of UMTS receives a service through a 3G network system. This is because, from the point of a network system, a 3G network system has a larger capacity than a 2G network system with respect to the number of subscribers accommodated by one base station and, from the point of users, users can be provided with more additional functions with the 3G service. However, it is troublesome when a user equipment camps in the 3G network system and cannot receive a circuit service, which is the most basic function of the user equipment, when the network system malfunctions and cannot normally provide the service, which is described above. The malfunction intermittently occurs but when it occurs, it causes much inconvenience to the user of the user equipment.

Current 3G user equipments support both 2G service and 3G service but, basically, they register their location in the 3G network system in an area where the 3G service is available, and receive the 3G services.

FIG. 1 illustrates a typical system information broadcasting process. Referring to FIG. 1, a User Equipment (UE) 100 receives a System Information Block (SIB) from a third-generation network system 110, e.g., a UTRAN, and acquires actual information on the network system. The UE 100 decides an available service based on the actual network system information.

The SIB that the user equipment 100 receives from the network system 110 is defined to have 18 types, i.e., from types 1 to 18. Among them, a System Information Block 1 (SIB 1) includes information on a core network for using a circuit service and a packet service.

The UE 100 performs a Location Area Update (LAU) in a Mobile Switching Center/Visitor Location Register (MSC/VLR) of the core network based on circuit switched domain information from the SIB provided from the network system 110, receives circuit service, performs Routing Area Update (RAU) through a Serving General Packet Radio Service (GPRS) Supporting Node (SGSN) within a core network based on Packet Switched Domain, and receives a packet service.

However, when the SIB does not include information needed for the UE 100 to be registered in a circuit switched domain or a packet switched domain due to malfunction of the 3G network system, the UE 100 executes registration in only one of the two domains. In this case, the UE 100 is regarded camping in the 3G network system, although it does not normally receive one service between the circuit service and the packet service.

FIG. 2 illustrates an abnormal system information block of the 3G network system, and FIG. 3 illustrates a normal system information block of the 3G network system.

Referring to FIGS. 2 and 3, the SIB of FIG. 3 includes information on both a packet switched domain and a circuit switched domain, whereas the SIB of FIG. 2 includes only a packet switched domain.

Although the UE 100 receives the abnormal system information block, it can successfully execute the routing area update process and normally receive the packet service because it includes information on the packet switched domain. However, since the UE 100 does not have information on the circuit switched domain, it does not attempt the registration for using the circuit service, i.e., location area update process, and thus it cannot receive the circuit service at all.

In short, the user equipment can use the packet service but it cannot use the circuit service. Moreover, since the user equipment is regarded as normally camping in the 3G network system, it does not display a current state such as 'service limited' and 'service searched', and a user cannot use the circuit service without knowing the reason.

This phenomenon occurs because the user equipment operates according to standard protocol defining the operation and state. According to the standard protocol (3GPP 25.331), when a user equipment performs a routing area update based on packet switched domain information and does not include information on the circuit switched domain in the system information block, the user equipment informs the state to an upper layer as it is and remains in a state incapable of providing the circuit service. Also, since the user equipment is regarded as camping in the 3G network system though the packet switched domain, it recognizes itself as being incapable of providing the circuit service and continues to wait.

After all, the user equipment cannot perform the location area update and receive the circuit service until it receives normal system information block from the network system. Without receiving the normal system information block, the user equipment cannot use the circuit service but use only additional services, while call transmission/reception is impossible. This problem occurs not only when the system information block does not include circuit switched domain information, but also when the user equipment receives a system information block including inappropriate core network information.

SUMMARY OF THE INVENTION

An aspect of the present invention is to substantially solve at least the above problems and/or disadvantages and to provide at least the advantages below. Accordingly, an aspect of the present invention is to provide an apparatus and method for providing a voice service, without discontinuance.

Another aspect of the present invention is to provide an apparatus and method for providing a voice service in a user equipment of a mobile communication system by camping the user equipment in another network system when the user equipment falls into an out-of-service state which is caused when it receives an inappropriate system information block.

A further aspect of the present invention is to provide an apparatus and method that can inform a user of the out-of-service state in a user equipment, when the user equipment falls into the out-of-service state due to reception of an inappropriate system information block; temporarily provides the user equipment with a voice service by camping the user equipment in another network system when the user selects to use the voice service; periodically checks whether it is possible to provide the voice service through the previous network system with a predetermined timer; and if the previous network system is available, resumes the previous network system.

According to one aspect of the present invention, in a method for providing a voice service without discontinuance in a mobile communication system, a system information block is received from a first network system and it is checked whether the voice service is available in the first network system. IF the voice service is not available in the first network system, a selection is received from a user for whether to use the voice service through a second network system or use a packet service through the first network system. When the user selects to use the voice service through the second network system, a predetermined timer is driven and a network system mode is changed into the second network system to thereby execute a location area update. After the location area update, the voice service is provided through the second network system.

According to another aspect of the present invention, in an apparatus for providing a voice service without discontinuance in a mobile communication system, a controller receives a system information block of a first network system or a system information block of a second network system from an interface module, and transmits a network selection change request to the interface module to change a network system mode. When the system information block of the first network system does not include voice switched domain information for a location area update, a network selector drives a predetermined timer according to a selection of a user, changes the network system mode into the second network system, and executes the location area update to thereby provide the circuit service.

BRIEF DESCRIPTION OF THE DRAWINGS

The above and other objects, features and advantages of the present invention will become more apparent from the following detailed description when taken in conjunction with the accompanying drawings in which:

FIG. 2 illustrates an abnormal system information block in a 3G network system;

FIG. 3 illustrates a normal system information block in the 3G network system;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Described hereinafter is an apparatus and method for providing a voice service, i.e., a circuit service, without discontinuance in a mobile communication system.

Figure 1:
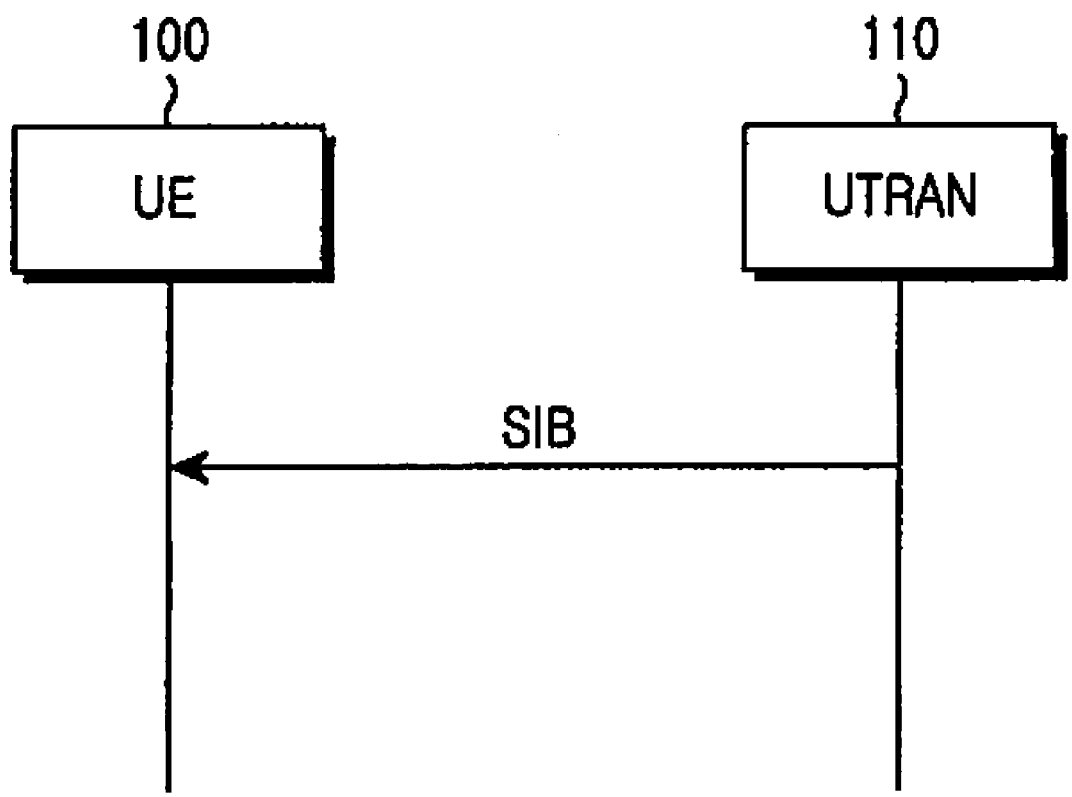
FIG. 1 illustrates a typical system information broadcasting process.
Figure 4:
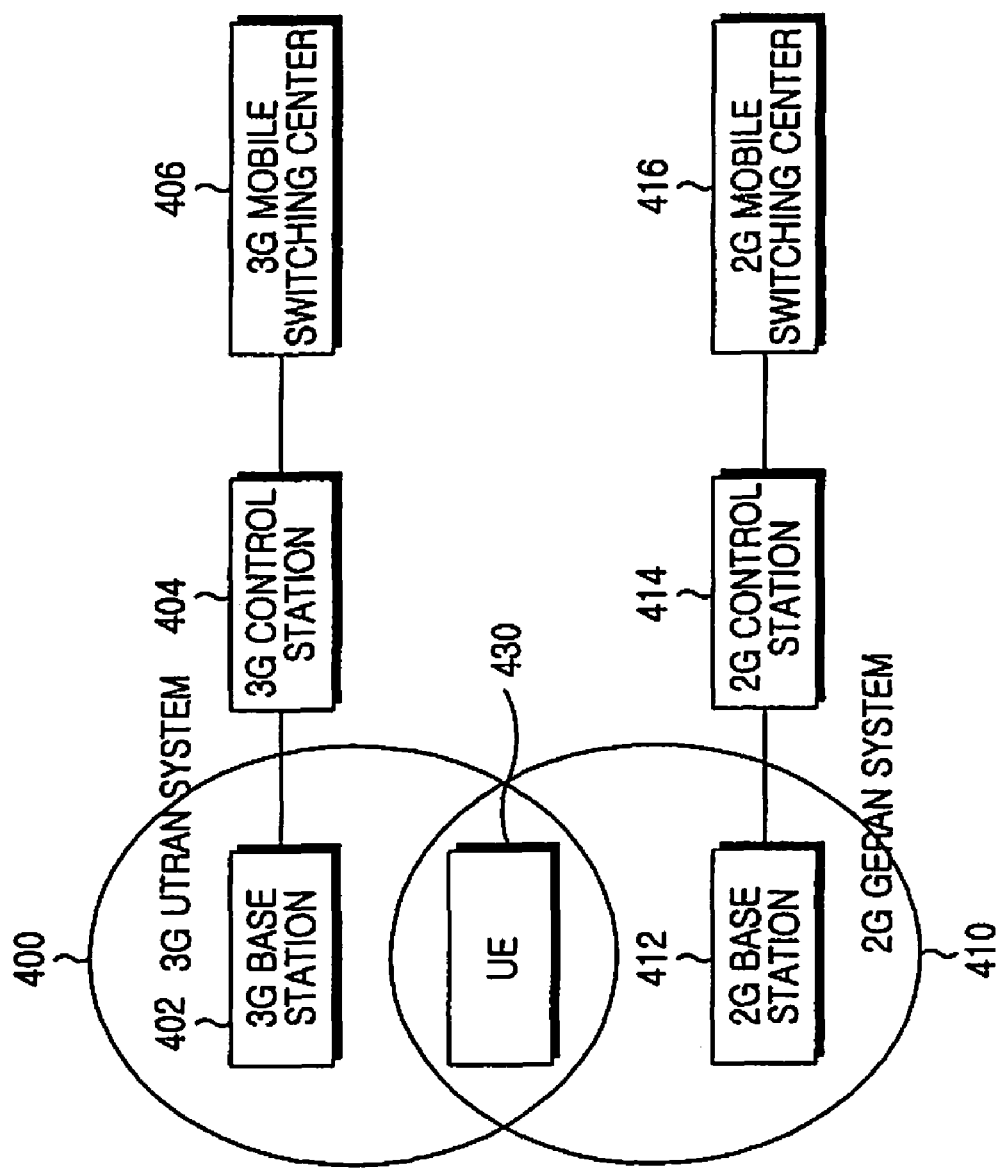
FIG. 4 illustrates a mobile communication system according to the present invention.

FIG. 4 illustrates a mobile communication system according to the present invention. Referring to FIG. 4, a user equipment 430 is capable of providing both a Third-Generation (3G) mobile communication system, e.g., a Universal Mobile Telecommunication Systems (UMTS), and a Second-Generation (2G) mobile communication system, e.g., 2G Global System for Mobile telecommunication (GSM)/Enhanced Data GSM Environment (EDGE) Radio Access Network (GERAN). Herein, the user equipment 430 is assumed to be in an area where an area 400 of the 3G mobile communication system is overlapped with an area 410 of the 2G mobile communication system.

A 3G mobile switching center 406, a 3G control station 404, and a 3G base station 402 constitute a 3G mobile communication system, and a system information block (SIB) of the 3G mobile communication system is transmitted to the user equipment through the third-generation base station 402.

A 2G mobile switching center 416, a 2G control station 414, and a 2G base station 412 constitute a 2G mobile communication system, and a system information block of the 2G mobile communication system is transmitted to the user equipment through the 2G base station 412.

The 3G mobile switching center 406 and the 3G mobile switching center 416 are part of a core network, and they can be shared by the 2G network system and the 3G network system according to an operation method.

Figure 5A:
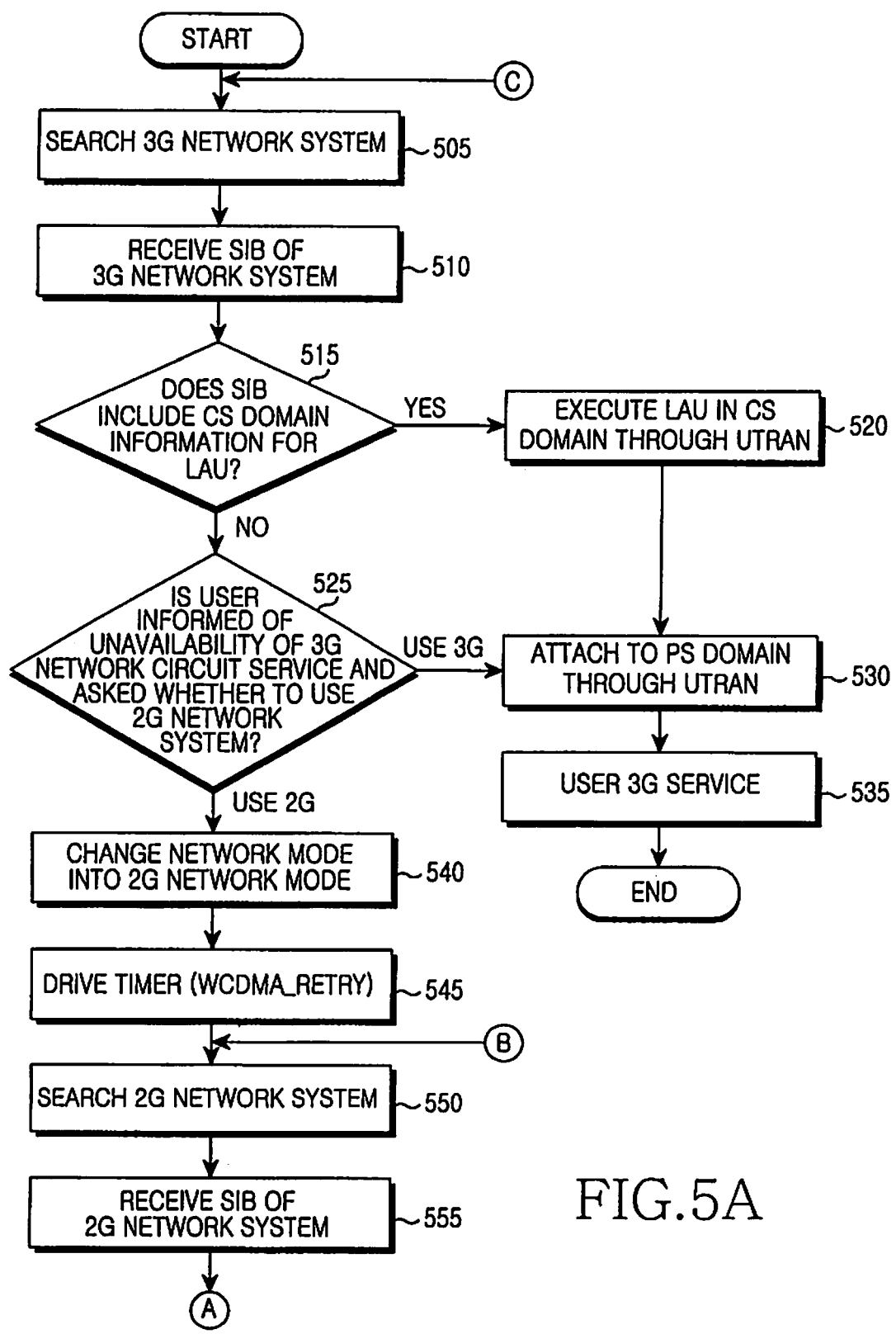
FIGS. 5A and 5B are flowcharts illustrating a network selection process in a user equipment according to the present invention.

FIG. 5 illustrates a network selection process in a user equipment according to the present invention. Referring to FIG. 5A, first, it is assumed that a user equipment capable of using the 3G network system and the 2G network system is positioned in an area where an area of the 3G network system is overlapped with an area of the 2G network system.

The user equipment searches a cell in the 3G network system in step 505, and receives a system information block in step 510. In step 515, the user equipment examines the received system information block to see if there is information for a location area update (LAU) in a circuit switched (CS) domain.

If the received system information block includes the circuit switched domain information, the user equipment executes camping through a location area update process of the 3G network circuit switched domain in step 520, executes a packet service attach process through a routing area update process of the 3G network packet switched (PS) domain in step 530, and receives a 3G service in step 535.

However, when the received SIB does not include or lacks circuit switched domain information due to a malfunction of the 3G network system, the user equipment informs a user of the fact, and asks the user in step 525 whether it will attempt camping in the 2G network system or still camps in the 3G network system while using only a packet service without the circuit service. When the user attempts to use a Wireless Application Protocol (WAP) service or an additional service through a personal computer (PC), such as the Internet service, it executes a packet service attach process through the routing area update process of the 3G network packet switched (PS) domain in step 530, and receives the packet service through the 3G network system in step 535.

When the user selects to camp the user equipment in the 2G network system and use the circuit service through the 2G network system, the user equipment is switched into a 2G network-dedicated mode in step 540.

Since the above-described phenomenon generally occurs due to a temporary malfunction of a network system, the user equipment resumes the circuit service in the 3G network system some time later. Also, the user may move to an area where the circuit service of the 3G network system is available and receive the circuit service through the 3G network system.

To prepare for this case, the user equipment drives a predetermined timer (WCDMA_Retry) in step 545, and checks the system information block of the 3G network system at a predetermined period. When the user equipment is changed into a 2G-dedicated mode, it receives the system information block (SIB) through a cell search process of the 2G network system in step 555.

Figure 5B:
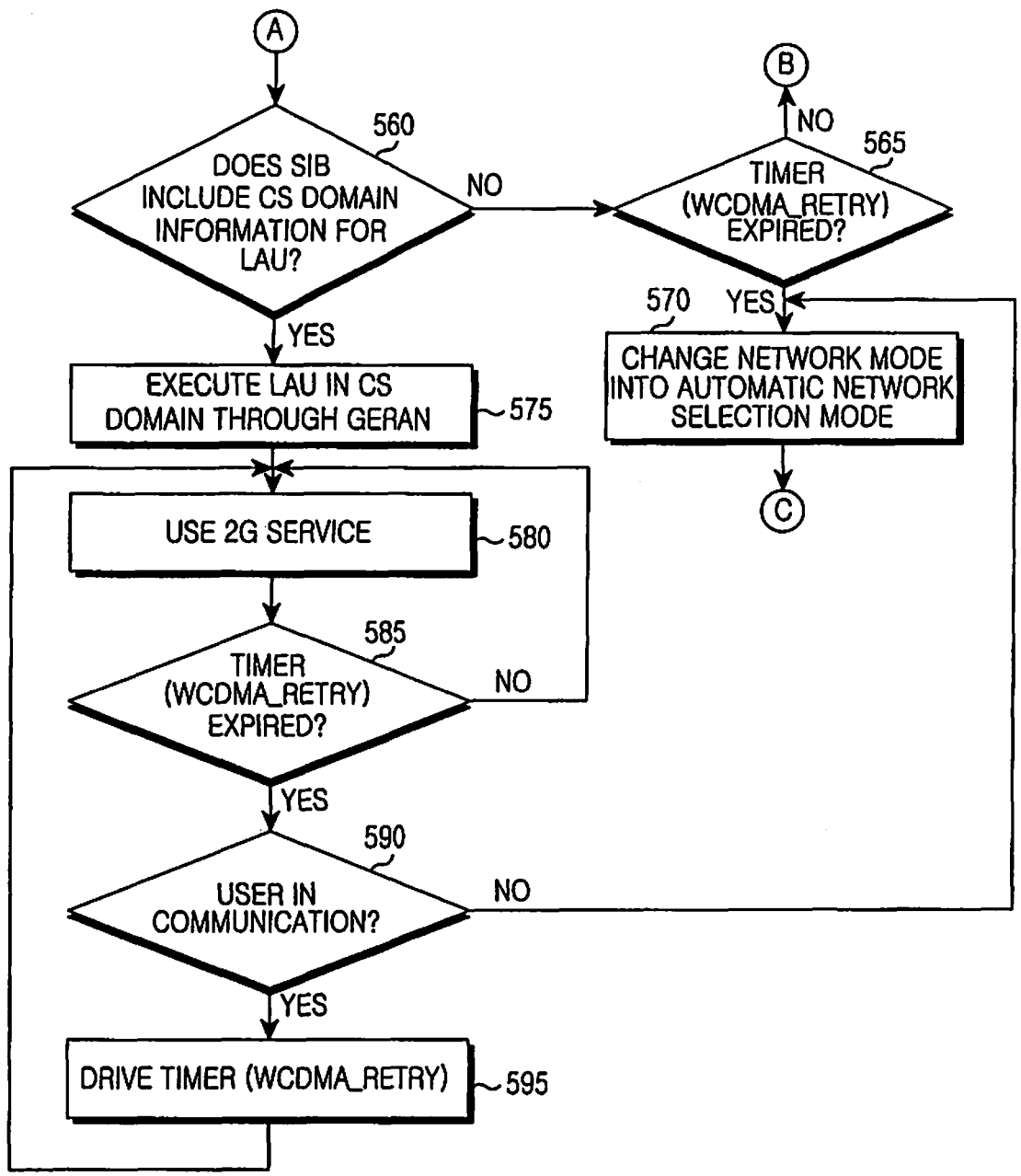

Referring to FIG. 5B, the user equipment checks the received system information block to see if it includes information for updating a location in a circuit switched domain in step 560.

If the received system information block includes information for updating a location in the circuit switched domain, it updates the location in the 2G network system in step 575, and uses the 2G service in step 580. In this case, too, the user equipment can receive a packet service through the 2G network system along with the circuit service. However, the service contents are different from services of the 3G network system, such as data transmission rate and whether both voice signals and packets are simultaneously supported. Since the difference between the packet service of the 2G network system and that of the 3G network system has little relation to the present invention, it will not be further described in detail.

When the received system information block does not include information for updating a location in the circuit switched domain, the user equipment checks whether the timer (WCDMA_Retry) has expired in step 565. When the timer has expired, the user equipment switches its network selection mode into an automatic network selection mode in step 570, and re-starts the process from the step of looking for a system information block by searching a cell from the 3G network system. In short, it goes back to step 505.

If the timer (WCDMA_Retry) has not expired, the user equipment executes the SIB search by searching a cell in the 2G network system until the timer has expired. In short, it goes back to step 550.

The user equipment periodically searches for a system information block of the 2G network system and the 3G network system by using the timer (WCDMA_Retry). Otherwise, the amount of power consumption may increase drastically, while the user equipment ping-pongs between the 2G network system and the 3G network system.

The user equipment continues to check whether the timer (WCDMA_Retry) has expired in step 585 while using the 2G network system in step 580. When the timer (WCDMA_Retry) is not expired, the user equipment uses the 2G network continuously. In other words, the user equipment goes back to the step 580.

When the timer (WCDMA_Retry) has expired, the user equipment checks in step 590 whether the user is in the middle of communication. When the user is in the middle of communication, i.e., when the user is on the line, the user equipment resumes the operation of the timer (WCDMA_Retry) in step 595, and continues to use the 2G network system. In short, it returns to the step 580.

When the user is not on the line in step 590, the user equipment changes the network selection mode into the automatic network selection mode in the step 570, and re-starts the process of checking a system information block by searching a cell in the 3G network system. In short, it returns to the step 505. Subsequently, the process of the present invention ends.

The circumstances that the circuit service cannot be provided in the 3G network system, which is assumed in the present invention, are different from a circumstance that the circuit service cannot be provided due to a rejection from a core network for some unknown reason in the middle of the location area update process.

The latter case occurs when the user equipment receives an adequate reject cause from the core network because there is a problem in the interlocking process with the MSC/VLR of the core network and/or in the user equipment itself, such as IMSI (International Mobile Subscriber Identity) Unknown in Home Location Register (HLR), Illegal Mobile Station (MS), Public Land Mobile Network (PLMN) not allowed, and the like. Also, since the user equipment has circuit switched domain information, it executes the location area update process, and a problem may occur in the location area update process.

In the present invention, however, the circuit service cannot be provided when the user equipment receives an inappropriate system information block from the UTRAN, which is the 3G network system. Herein, the problem occurs because the user equipment does not attempt the location area update process for the circuit service at all.

Figure 6:
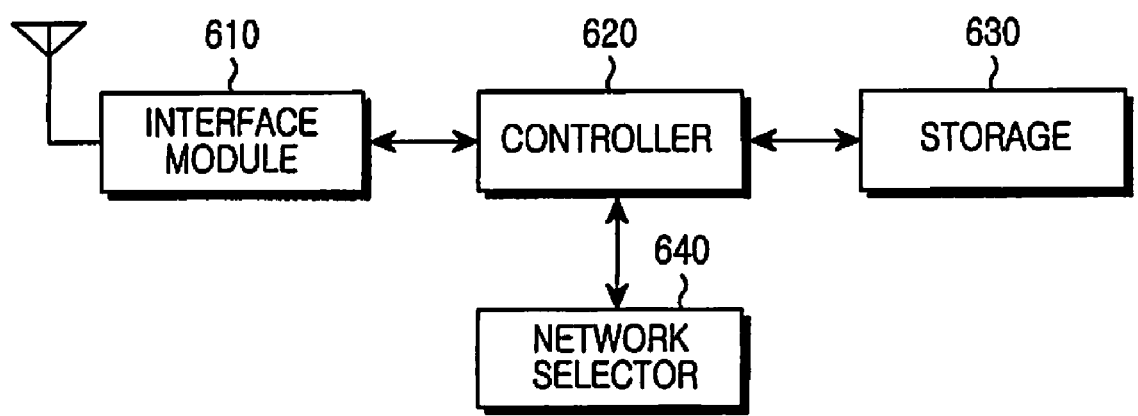
FIG. 6 illustrates a user equipment according to the present invention.

FIG. 6 illustrates a user equipment according to the present invention. Referring to FIG. 6, a controller 620 makes it possible to receive the circuit service through the 2G network system capable of location area update upon the selection of a user in addition to the general and intrinsic function of managing voice or data communication by controlling a network selector 640, when circuit switched domain information for location area update is not included in a system information block of the 3G network system but included in a system information block of the 2G network system. To provide the circuit service through the 2G network system, the controller 620 provides the system information block received from an interface module 610 to the network selector 640. The network selector 640 transmits a network selection change request to the interface module 610 to thereby change the network mode.

When the system information block of the 3G network system transmitted from the interface module 610 includes the circuit switched domain information for location area update, the network selector 640 provides the circuit service in the 3G network system through the location area update. When the system information block of the 3G network system does not include the circuit switched domain information for location area update, the network selector 640 drives a predetermined timer according to the selection of the user, changes the network mode into the 2G network system, performs location area update, and provide the circuit service.

The network selector 640 checks whether the timer has expired while the user equipment receives the circuit service through the 2G network system. When the timer has expired and the user is not on the line, the network selector 640 changes the network mode into the automatic network selection mode, checks a system information block through the 3G network system. When the system information block of the 3G network system includes circuit switched domain information for location area update, the network selector 640 executes a location area update and provides the circuit service. Also, the network selector 640 checks whether the timer has expired while the user equipment receives the circuit service through the 2G network system and, when the timer has expired and the user is on the line, it drives the timer again and continues to provide the circuit service through the 2G network system.

When the system information block does not include the circuit switched domain information for location area update, the user equipment uses only the packet service through the 3G network system after receiving the selection of the user.

A storage 630 stores a program for controlling generation operation of the apparatus and stores temporary data generated in the middle of executing the program.

The interface module 610 communicates with another node and it includes a Radio Frequency (RF) processor and a baseband processor. The RF processor converts signals received through an antenna into baseband signals and provides the baseband signals to the baseband processor, and it converts baseband signals transmitted from the baseband processor into RF signals that can be transmitted over the air and transmits the RF signals through the antenna.

In the above-described block structures, the controller 620 may execute the function of the network selector 640. However, the two constituent elements have been illustrated separately herein to distinctively describe each function. Therefore, when an actual product is realized, the controller 620 may be realized to execute all or part of the functions of the network selector 640.

When the user cannot use the voice communication function, which is the basic function of a user equipment, due to a malfunction of the 3G network system, the apparatus and method of the present invention solves the problem and makes the user equipment use the circuit service by temporarily camping the user terminal in the 2G network system upon receipt of the user selection.

Also, the apparatus and method of the present invention gives the user an option whether to use only the packet service in the 3G network system or use the circuit service by camping the user equipment in the 2G network system.

In addition, it periodically checks the system information block of the 3G network system by driving the timer in the middle of using the circuit service through the 2G network system and, when the system information block of the 3G network system includes circuit switched domain information for location area update, it camps the user equipment in the 3G network system to thereby use the circuit service in the 3G network system.

Exemplary embodiments of the present invention can also comprise computer readable codes on a computer readable medium. The computer readable medium can comprise any data storage device that can store data that can be read by a computer system. Examples of a computer readable medium include magnetic storage media (such as, Read-Only Memory (ROM), floppy disks, hard disks, among others), optical recording media (such as, Compact Disc (CD)-ROMs, or Digital Versatile Discs (DVDs)), and storage mechanisms such as carrier waves (such as, transmission through the Internet). The computer readable medium can also be distributed over network coupled computer systems so that the computer readable code is stored and executed in a distributed fashion. Also, functional programs, codes, and code segments for accomplishing exemplary embodiments of the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims. For example, the structures of a transmitter and a receiver according to the above-described embodiments of the present invention may be modified according to a standard specification or the intention of a designer. Therefore, the scope of the present invention should not be defined by the embodiments described above but defined by the following claims and equivalents thereof.

What is claimed is:

1. A method for providing a voice service without discontinuance in a mobile communication system, comprising:
    receiving a system information block from a first network system and checking whether the voice service is available in the first network system;
    if the voice service is not available in the first network system, receiving a selection from a user for whether to use the voice service through a second network system or use a packet service through the first network system;
    when the user selects to use the voice service through the second network system, driving a timer, changing a network system mode to the second network system, and executing a location area update;
    after the location area update, providing the voice service through the second network system;
    checking whether the timer has expired while the voice service is provided through the second network system;
    when the timer has expired and the user is in the middle of communication, driving the timer again and providing the voice service through the second network system; and
    when the timer has expired and the user is not in the middle of communication, changing the network system mode to the first network system, receiving a system information block from the first network system, and checking whether the voice service is available.

2. The method of claim 1, further comprising:
    when the user selects to use the packet service through the first network system, changing the network system mode to the first network system, executing a routing area update, and providing the packet service.

3. An apparatus for providing a voice service without discontinuance in a mobile communication system, comprising:
a controller for receiving one of a system information block of a first network system and a system information block of a second network system from an interface module, and transmitting a network selection change request to the interface module to change a network system mode;
a network selector for, when the system information block of the first network system does not comprise voice switched domain information for a location area update, driving a timer according to a selection of a user, changing the network system mode to the second network system, and executing the location area update to thereby provide the voice service,
wherein the network selector checks whether the timer has expired while the voice service is provided through the second network system,
when the timer has expired and the user is not in the middle of communication, the network selector changes the network system mode to the first network system, checks a system information block, and when the system information block comprises voice switched domain information for the location area update, executes the location area update and provides the voice service through the first network system, and
when the timer has expired and the user is in the middle of communication, the network selector drives the timer again and provides the voice service through the second network system.

4. The apparatus of claim 3, wherein, when the system information block of the first network system does not comprise voice switched domain information for the location area update, the network selector executes a routing area update in the first network system upon receipt of a selection from the user and provides a packet service.

5. The apparatus of claim 3, wherein, when the network selector requests the interface module to change the network mode.

6. A method for providing a voice service in a mobile communication system, comprising:
receiving a system information block from a first network system and checking whether the voice service is available in the first network system;
if the voice service is not available in the first network system, determining whether to use the voice service through a second network system;
driving a timer, changing a network system mode to the second network system, and executing a location area update;
providing the voice service through the second network system;
checking whether the timer has expired while the voice service is provided through the second network system;
when the timer has expired and the user is in the middle of communication, driving the timer again and providing the voice service through the second network system; and
when the timer has expired and the user is not in the middle of communication, changing the network system mode to the first network system, receiving a system information block from the first network system, and checking whether the voice service is available.

7. An apparatus for providing a voice service in a mobile communication system, comprising:
means for, receiving a system information block from a first network system and checking whether the voice service is available in the first network system;
means for, if the voice service is not available in the first network system, determining whether to use the voice service through a second network system;
means for driving a timer, changing a network system mode to the second network system, and executing a location area update;
means for providing the voice service through the second network system; and
means for checking whether the timer has expired while the voice service is provided through the second network system;
means for driving the timer again and providing the voice service through the second network system, when the timer has expired and the user is in the middle of communication; and
means for changing the network system mode to the first network system, receiving a system information block from the first network system, and checking whether the voice service is available, when the timer has expired and the user is not in the middle of communication.

8. A non-transitory computer-readable recording medium having recorded thereon a program for providing a voice service in a mobile communication system, comprising:
a first code segment, for, receiving a system information block from a first network system and checking whether the voice service is available in the first network system;
a second code segment, for, if the voice service is not available in the first network system, determining whether to use the voice service through a second network system;
a third code segment, for driving a timer, changing a network system mode to the second network system, and executing a location area update;
a fourth code segment, for providing the voice service through the second network system;
a fifth code segment for checking whether the timer has expired while the voice service is provided through the second network system;
a sixth code segment for driving the timer again and providing the voice service through the second network system, when the timer has expired and the user is in the middle of communication; and
a seventh code segment for changing the network system mode to the first network system, receiving a system information block from the first network system, and checking whether the voice service is available, when the timer has expired and the user is not in the middle of communication.

* * * * *